Patented Mar. 26, 1946

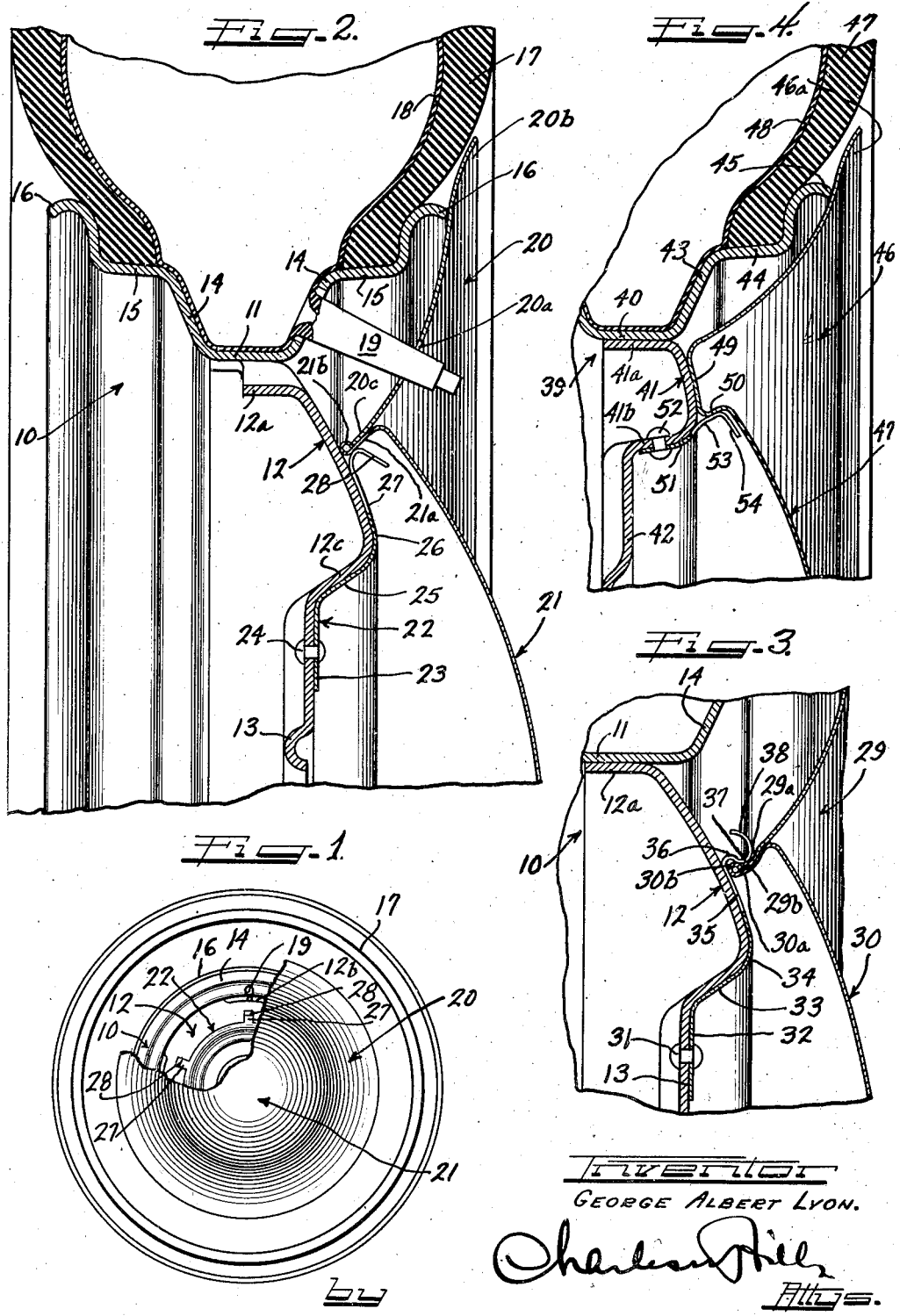

2,397,360

UNITED STATES PATENT OFFICE 2,397,360

WHEEL STRUCTURE

George Albert Lyon, Allenhurst, N. J.

Application September 6, 1943, Serial No. 501,345

3 Claims. (Cl. 301—37)

This invention is directed to an improved wheel structure and relates more particularly to a novel cover assembly therefor.

It is an important object of the invention to provide for a wheel structure, an improved cover assembly having a novel retaining arrangement whereby it is securely maintained in removable relationship over the outer side of the wheel structure to conceal the outer side of the wheel.

Still another object of the invention is to provide a wheel cover having a radially outer annular part formed from sheet synthetic plastic material or the like and having physical characteristics enabling it to be form retaining and self-supporting and yet resiliently, locally deflectable whereby it immediately snaps back into its initial position upon the release of the deflecting forces, this cover part being of minimum weight and thus decreasing the unsprung weight of a vehicle with which it is associated.

Still a further object of the invention is to provide for a wheel structure, a multi-part cover assembly including a radially outer annular portion and a central circular hub cap simulating portion, these portions being maintained together and detachably secured on the outer side of a wheel structure by improved retaining means.

Still a further object of the invention is to provide for a wheel structure, a cover assembly including an outer annular part formed from synthetic sheet material or the like, said annular part having a cross-sectional configuration whereby it extends radially over the outer side of the radially outer portion of a wheel structure and also substantially simulates the curvature of the side wall of a tire associated with said wheel structure to give the appearance of being a part thereof and to give the appearance of a white side on a massive tire mounted in a wheel structure of minimum dimensions, when colored white.

Still a further object of the invention is to provide for a wheel structure a cover including a portion arranged to overlie the radially outer parts of the wheel structure and a portion arranged to overlie the central portion thereof, the junction between said portions being arranged to receive retaining means in detachable engagement, said retaining means including members having cover retaining parts and inwardly extending wheel engaging parts.

In accordance with the general features of the invention there is provided a multi-part cover assembly having a radially outer annular portion formed from synthetic plastic or the like and having physical characteristics enabling it to be self-sustaining as to form and yet resiliently flexible, whereby it will snap back immediately into its initial position upon the release of distorting pressures therefrom, the said cover part having a cross-sectional configuration enabling it to substantially simulate the side wall of a tire in the tire rim to give the appearance of being a continuation thereof and thus the white side wall of a massive tire mounted on a wheel structure of minimum dimension when colored white, there also being provided a central circular hub cap simulating member having a radially outer portion arranged to detachably receive the inner edge of the radial cover portion, the cover assembly being retained over the outer side of a wheel structure by virtue of retaining means including an annular part attached to the wheel structure at a radially inner portion thereof and radially outwardly extending resilient cover retaining means for engaging the central cover parts and thus maintaining the entire assembly upon the wheel structure.

In accordance with another form of the invention, there is provided herein a cover including a circular, integral assembly including a radially outwardly extending annular portion and a central circular portion, said cover being formed from synthetic plastic or the like and having physical characteristics enabling it to be self-supporting as to form and yet resiliently deflectable, said cover being formed at an intermediate portion thereof with an annular wheel engaging part and an annular retaining portion for maintaining the same over the wheel structure.

Other objects and advantages of the invention will become apparent from the following description and accompanying drawing, in which:

Figure 1 is a side elevation of a wheel structure embodying one form of my invention, parts being broken away for illustrative purposes;

Figure 2 is a fragmentary radial cross-sectional view of a wheel structure such as that shown in Figure 1;

Figure 3 is a fragmentary radial cross-sectional view of a modified form of the invention; and Figure 4 is a radial cross-sectional view of still a further modified form of the invention.

It will be understood that the embodiments shown herein are for illustrative purposes only and may be changed or modified without departing from the spirit and scope of the invention as set forth in the appended claims.

The wheel structure shown in Figures 1 and 2, with which my invention is associated, includes a tire rim part 10 of the drop center type having a base flange 11 and a central load bearing portion or spider part 12 having at the radially outer portion thereof an axially inwardly extending flange 12a which is secured by riveting or welding or the like to the base flange 11 to provide a unitary wheel structure. If desired, the flange 12a may be depressed radially inwardly at circumferentially spaced parts to afford in the wheel structure, air circulation apertures 12b, which, as shown in Figure 1 are disposed along the junction between the tire rim part 10 and the central load bearing portion 12.

The central load bearing portion 12 is further provided at the radially inner part thereof with a central bolt-on flange 13 which may be utilized for securing the wheel structure to an appropriate part of the vehicle such as the brake drum or the like.

The tire rim 10 is further provided with opposite side wall flanges 14, opposite intermediate flanges 15 and opposite edge portions 16, between which is adapted to be disposed the radially inner part of a tire 17 having an inner tube 18 and a valve stem 19 which extends through a suitable aperture in the adjacent side wall flange 14.

The cover assembly shown herein includes a radially outer annular portion 20 and a central circular hub cap simulating portion 21. The cover part 20 is constructed from sheet synthetic plastic material and has physical characteristics enabling it to be self-supporting as to form and yet resiliently, locally deflectable whereby it may be sprung outwardly at the radially outer part thereof to permit the insertion of a pry-off tool therebehind as will be explained presently. Thus, when the deflecting pressure is released therefrom, it will immediately snap back into the position shown in Figure 2. This cover member preferably is provided with an aperture 20a through which the valve stem 19 may protrude to be accessible for the application of a nozzle of an air hose thereto for inflation of the tire.

As will be seen from Figure 2, the cover member 20 is provided with a cross-sectional configuration of such expanse that the radially outer margin 20b thereof extends radially outwardly beyond the edge portion 16 of the tire rim 10 and over the adjacent portion of the outer side wall of the tire 17, thus to conceal the junction between the tire rim and the tire. Furthermore, in order to present a smooth riding surface to the side wall of the tire during lateral expansion thereof under load bearing conditions, the portion 20b of the cover part 20 is flared radially, axially outwardly as shown.

The central hub cap simulating cover member 21 is preferably circular in form and is provided at the radially outer margin thereof with a radially inwardly, axially inwardly, obliquely disposed flange 21a which terminates in a circular bead 21b. If desired, the central hub cap member 21 may also be formed from synthetic plastic sheet material, however, in order to facilitate the retention thereof upon the wheel structure in a manner to be presently described, this cover portion is preferably formed from thin sheet metal. Furthermore, the metal is well adapted to take an enamel finish to provide a contrasting effect with the cover portion 20 or, if desired, it may be finished to provide a luster as by chromium plating or a polishing process.

As will be seen from Figure 2, the cover member 20 extends radially inwardly beyond the junction between the tire rim and the central load bearing portion of the wheel structure so that the radially inner margin 20c thereof is disposed in surface abutting engagement with the outer surface of the flange 20a with the edge abutting the nip or corner formed between the bead 21b and the flange 21a. Preferably the cover member is assembled into a unitary structure as above described by aligning the cover members concentrically with respect to one another with the cover member 20 axially inwardly of the cover member 21, whereupon axial outward movement of the radially outer annular cover member causes the same to yield at the inner margin thereof so that the portion 20c may be snapped securely into the position shown in Figure 2.

To the end that the cover assembly as above described may be securely retained in detachable engagement upon the wheel structure, there is provided herein a retaining assembly which includes an annulus 22 having a radially inner portion 23 disposed in surface engagement with the adjacent portion of the outer surface of the bolt-on flange 13, these parts being welded or riveted together as shown at 24. The flange 23 merges into an obliquely disposed flange 25 which is arranged for surface abutment with a portion 12c of the central load bearing part, this portion 25 of the retaining member 22 merging around the outer surface of the central load bearing portion 12 of the wheel as shown at 26. The annular portion of the retaining member, including parts 23, 25 and 26, is provided at the radially outer edge thereof with a plurality of radially outwardly extending, circumferentially spaced retaining elements including arms 27 which preferably lie in surface engagement with the adjacent portion of the outer surface of the central load bearing portion 12 and radially inwardly, substantially axially outwardly disposed resilient fingers 28.

In applying the cover assembly including the parts 20 and 21 to the wheel structure after they are assembled in the position shown in Figure 2 to form a unitary cover, it will be seen that it is merely necessary to align the cover concentrically with the wheel structure and particularly the members 27 and 28 of the retaining assembly, whereupon the cover may be urged axially inwardly of the wheel structure and the bead 21b of the cover member 21, being resilient, will be forced out of round as it overrides the radially outwardly extending peaks of the retaining assembly. Thereafter, the bead again snaps back into its circular condition to securely retain the cover assembly in the position shown in Figure 2. In order to remove the cover assembly from the wheel structure, it is merely necessary to flex the cover member 20 from the radially outer portion thereof to permit the insertion of the point of a pry-off tool between the wheel structure and the cover assembly, whereupon the radial outward movement of the handle of the pry-off tool with the edge portion 16 as the fulcrum will cause the tip thereof to move axially outwardly against the bead 21b thereby to force the same axially outwardly over the respective retaining members.

With such a construction, it will be seen that there is provided herein a cover assembly in which the radially outer part is of relatively great expanse and extends from an overlying position with respect to the tire 17, inwardly beyond the junction of the tire rim 10 and the central load bearing portion 12 of the wheel and that the retaining means extends radially outwardly from a radial inward position where it is conveniently attached to the bolt-on flange 13 of the wheel which, as will be seen from Figure 2, is disposed in an axially inwardly offset position from the radially outer adjacent portion of the wheel structure.

In the construction shown in Figure 3, the wheel assembly shown is essentially similar to that described in conjunction with Figure 2, however, in this construction the cover parts 29 and 30, while they may be secured together to provide a unitary structure differ from the construction of Figure 2 in that they engage radially inwardly of the retaining assembly rather than radially outwardly thereof.

In this construction the cover member 29 is provided at the radially inner margin thereof with an annular arcuate formation as shown at 29a, this arcuate formation terminating in a substantially radially outwardly extending lip 29b. The cover member 30 is provided at the radially outer margin thereof with a similarly arcuate portion 30a which terminates in a bead 30b. The bead 30a is adapted to receive on the radially outer face thereof and in surface engagement therewith, the arcuate annular portion 29a of the cover member 29, while the lip 29b of the cover member 29 is adapted to be seated against the axially outer face of the bead 30b of the cover member 30. Thus there is provided a unitary structure in which the cover parts are securely maintained together. As in the case of the construction in Figure 2, the cover members 29 and 30 may be secured together by movement of the cover member 29 axially inwardly so that the lip 29b thereof overrides the bead 30b of the cover member 30 to be disposed in the position shown in Figure 3.

In this construction the retaining assembly may be riveted to the wheel structure as shown at 31. This retaining assembly includes an annular portion including an inwardly extending flange 32 which is the instrumentality that secures the same to the wheel structure, an intermediate obliquely disposed flange 33 adapted for surface engagement with the adjacent portion of the outer surface of the central load bearing portion 12 and a curvate portion 34 which terminates in radially outwardly extending, circumferentially spaced arms 35 which in turn terminate in portions 36 cross-sectionally configurated to provide a substantially radially inwardly extending groove. The retaining fingers are also provided at the radially outer portions thereof to afford radially inwardly extending humps 27 and aligning flanges 38. Thus it will be seen that when the cover assembly is aligned concentrically with the wheel structure and urged axially inwardly, the bead 30b is pressed beyond the portion 37 of the circumferentially spaced fingers whereby these portions flex radially outwardly until the bead has attained the position shown in Figure 3, whereupon the fingers flex radially inwardly to secure the cover assembly upon the wheel structure.

In the construction shown in Figure 4, the tire rim 39 is of a drop center type and provided with a base flange 40 which is secured to a central load bearing portion 41 by means of it being riveted or welded to the radially outer surface of an axially inwardly extending flange 41a formed on the central load bearing portion 41. The central load bearing portion 41 is provided with an axially inwardly off-set integral bolt-on flange 42 while the tire rim is further provided with opposite side wall flanges 43, opposite intermediate flanges 44 and opposite edge portions 45, between which may be disposed the radially inner parts of a tire 47 having a tire rim 48.

The cover assembly of Figure 4 includes a circular disk-like cover member having a radially outer portion 46 and a central circular hub cap simulating portion 47. Preferably this cover is formed from sheet synthetic plastic material, the weight of which is such that the unsprung weight of the vehicle with which it is associated is greatly reduced. The radially outer annular portion 46 of the cover assembly of Figure 4 is of such cross-sectional configuration and magnitude that it simulates the side wall of the tire 16 and completely conceals the junction between the tire rim and the tire as by the radially outer marginal portion 46a and extends radially inwardly to a portion of the wheel structure disposed radially inwardly of the junction between the tire rim 39 and the central load bearing portion 41.

The cover member is provided between the portions 46 and 47 thereof with a generally radially extending flange 49 which is arranged to lie in abutting surface engagement with the adjacent portion of the outer surface of the spider or central load bearing portion 41 while this annular intermediate flange 49 is joined to and offset from the crown portion of the central cover member 47 by means of a flange 50 which preferably extends radially outwardly, axially outwardly to be disposed in a generally oblique position to facilitate snap-on engagement of the cover with the wheel structure.

To the end that the cover may be retained on the wheel structure, there is provided herein a retaining assembly including an annulus 51 which is secured to the central load bearing portion 41 and particularly to the flange 41b thereof which joins the radially outer portion to the central bolt-on flange 42, by means of welding or riveting as shown at 52.

The annulus 51 terminates at the outer edge thereof in circumferentially spaced, outwardly extending resilient fingers or clips including generally axially outwardly, radially outwardly extending, obliquely disposed arm portions 53 and generally radially inwardly extending terminal portions 54. The portions 53 being arranged to receive the flange 50 in snap-on pry-off engagement to retain the cover member upon the wheel structure. It will be seen that when the cover is aligned concentrically with the clip members shown in Figure 4 and is then urged axially inwardly with respect to the wheel structure, the axially inner portion of the flange 50, which prescribes a circle of less diameter than that prescribed by the radially outwardly extending peaks between the portions 53 and 54 of the retaining member passes over said peaks by virtue of resilient radial inward flexure of the fingers of the retaining assembly whereby the flange 50 comes to rest in surface engagement against the portions 53 of the fingers after said fingers have again flexed radially outwardly.

It will be seen that in all forms of the invention the resilient retaining fingers are provided with terminal parts by means of which the portions of the cover which are retainingly engaged, are automatically aligned in concentricity with the wheel structure in the event that the operator has placed them in misalignment before the axial inward movement of the cover member takes place. Furthermore, in all forms of the invention the retaining means is so arranged that the wheel engaging portions thereof extend radially inwardly to be housed beneath the central circular hub cap simulating cover portion of the cover.

What I claim is:

1. In a wheel structure having a tire rim and a central load bearing portion, said central load bearing portion including a bolt on flange disposed in a plane offset axially inwardly from the axially outer extremity of said load bearing portion, a cover assembly including an outer, relatively frangible, plastic annular part and a relatively rigid central circular hub cap simulating part, said cover parts having the radially inner and radially outer margins thereof respectively arranged for interlocking engagement to provide a generally axially inwardly extending junction flange intermediate the cover assembly and retaining means having a portion attached to the offset bolt on flange and also having a portion extending radially outwardly therefrom formed at the radially outer terminal thereof to provide a generally radially extending hump for retainingly engaging the generally axially inwardly extending junction of the cover parts to maintain the cover assembly upon the wheel structure, said terminals of said retaining means being turned back thereon axially outwardly and radially inwardly.

2. In a wheel structure having a tire rim and a central load bearing portion, a cover assembly including an outer, relatively frangible, plastic, annular part and a central relatively rigid circular hub cap simulating part, said cover parts having the radially inner and radially outer margins thereof respectively arranged for interlocking engagement to provide a generally axially inwardly extending junction flange intermediate the cover assembly and retaining means having a portion attached to the central load bearing portion of the wheel inwardly of the hub cap simulating part and a portion formed at a terminal thereof to provide a plurality of generally radially extending humps for retainingly engaging the generally axially inwardly extending junction flange of the cover parts to maintain the cover assembly upon the wheel structure, said terminals being turned back thereon axially outwardly to form alignment surfaces for the axially inwardly extending junction flange of said cover assembly.

3. In a wheel structure, a wheel including a multi-flanged tire rim part and a body part having an outwardly bulged portion terminating in a depressed central portion and cover retaining spring clips projecting from said depressed central portion axially outwardly beyond and over the bulged portion and a cover for said wheel parts having an annular shoulder snapped over said spring clips opposite said bulged portion and resiliently wedged by said clips against said bulged portion radially outwardly of said depressed central portion, said cover including an outer annular plastic portion for substantially concealing exposed outer side flanges of the rim part and a central hub cap portion connected to said outer annular portion at said shoulder, said outer annular cover portion being resiliently deflectable relative to said shoulder and generally axially outwardly from the wheel without necessitating removal of the cover from the wheel.

GEORGE ALBERT LYON.